No. 633,144. Patented Sept. 19, 1899.
A. C. McLAUGHLIN.
FACING FOR GARMENTS.
(Application filed Mar. 11, 1899.)
(No Model.)

WITNESSES:
Wm. D. Bell.
Robert J. Pollitt.

INVENTOR
Alfred C. McLaughlin,
BY
Gartner & Steward
ATTORNEYS

United States Patent Office.

ALFRED C. McLAUGHLIN, OF PATERSON, NEW JERSEY, ASSIGNOR OF ONE-HALF TO ROBERT L. McLAUGHLIN, OF SAME PLACE.

FACING FOR GARMENTS.

SPECIFICATION forming part of Letters Patent No. 633,144, dated September 19, 1899.

Application filed March 11, 1899. Serial No. 708,631. (No model.)

*To all whom it may concern:*

Be it known that I, ALFRED C. McLAUGHLIN, a citizen of the United States, residing in Paterson, in the county of Passaic and State of New Jersey, have invented certain new and useful Improvements in Facings for Garments; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention consists in an improvement upon the facing for garments constituting the subject-matter of Letters Patent No. 619,984, issued to me February 21, 1899.

The general objects of my invention are to provide a facing for garments, and particularly for skirts, that cannot only be inexpensively and readily manufactured and will be well adapted to adequately protect the garment against wear, but which will be in itself durable and attractive.

A special object of the invention is to so shape or cut the facing or the component parts to form it that it will set nicely and smoothly against the garment, especially where the latter is a skirt wherein the circumference varies more or less throughout its length.

I have fully illustrated my invention in the accompanying drawings, wherein—

Figure 1:
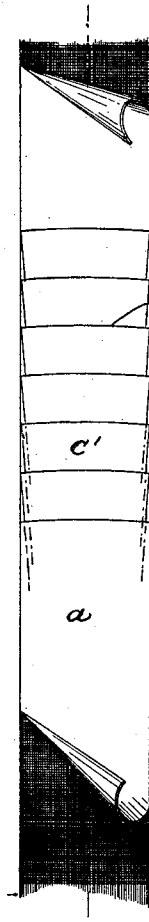
Figure 2:
Figure 3:
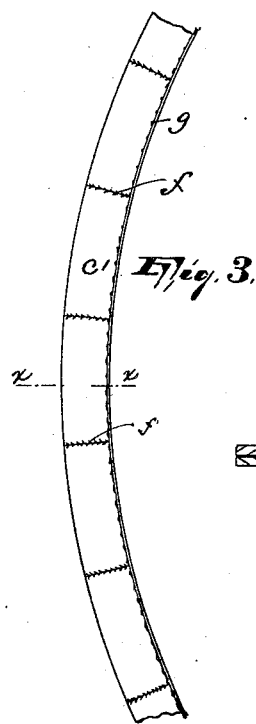
Figure 4:
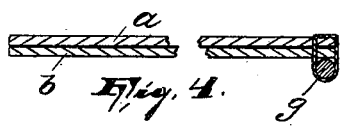

Figure 1 shows a piece of the material from which the facing is formed, showing the manner of cutting the same so as to produce the component parts or strips of said facing. Fig. 2 is a longitudinal sectional view, somewhat enlarged, of a piece of the material from which said facing is formed. Fig. 3 is a view of the facing in its completed form, and Fig. 4 is an enlarged transverse sectional view taken on the line $x$ $x$ in Fig. 3.

In order to produce my improved facing, I take two pieces $a\,b$ of suitable material, both preferably textile, and secure them together in laminated arrangement by means of some adhesive substance $c$, such as glue or mucilage, which is disposed between them. The two pieces selected should be of considerable length, for out of them is to be cut a number of strips which are to compose the finished facing. Having thus formed a practically integral and single piece of material, I cut the same transversely along parallel curved lines $d$, which are described about points that are coincident with the central line of the material, being arcs of circles. Such cut lines or curved edges produce the upper and lower edges for the finished facing or binding. I then cut off the ends of each strip $c'$ thus outlined upon lines which extend radially from the center about which the outermost arc of the strip is described to each of its ends. This produces a strip of substantially segmental shape. Though these strips may be cut out by hand, I prefer to employ a machine for this purpose in which a die is used that will cut out the whole strip at once. Having thus produced the several strips, I secure them together, as by stitching $f$, into a single curved piece, such as is shown in Fig. 3.

The arcs which the side edges of each of the strips $c'$ constitute should preferably be of a circle whose radius is about twenty-four feet; but it may be more or less, as desired.

A binding $g$, which consists of a cord that is stitched along the inner curved edge of the otherwise completed strip of facing, may be provided so as to strengthen the facing and more firmly secure its component portions or strips together.

The completed facing is secured to the inside of skirt along both of its longitudinal edges with the one that has the binding uppermost.

Owing to the curvature in the facing, wrinkles or tucks that would otherwise form if the facing were straight and because the lowermost circumference of the skirt is its greatest one are obviated, the normal shape of the facing when in position conforming to that of said skirt.

The two layers of material may be secured together back to back (back surface to back surface) or with the front surface of one adjacent to the back surface of the other; but I prefer the latter disposition, as the facing will thus have a "right" and "wrong" side.

Although I have herein particularly described a method of forming the facing, it is obvious that the same may be varied without departing from the spirit of my invention.

Having thus fully described my invention, what I claim as new, and desire to secure by Letters Patent, is—

As a new article of manufacture a skirt facing or binding composed of a plurality of segmental pieces united together end to end, each having the upper and lower edges correspondingly curved, and its end edges formed straight on substantially the radial line of said curve of the upper and lower edges, whereby the segmental pieces being united together along their straight edges a facing or binding is formed having a continuous curve in a single plane.

In testimony that I claim the foregoing I have hereunto set my hand this 8th day of March, 1899.

ALFRED C. McLAUGHLIN.

Witnesses:
JOHN W. STEWARD,
ALFRED GARTNER.